2,809,975
Patented Oct. 15, 1957

2,809,975

PROCESS FOR THE PREPARATION OF ENDO-VINYLENE CYCLOHEXANE TETRACARBONIC ACID AND ANHYDRIDE

André von Bézard and Adrien Perret, Neuchatel, Switzerland, assignors to Lonza Elektrizitatswerke und Chemische Fabriken Aktiengesellschaft, Basel, Switzerland, a Swiss company No Drawing. Application June 30, 1953,
Serial No. 365,260

Claims priority, application Switzerland July 3, 1952

10 Claims. (Cl. 260—346.6)

The invention relates to a process of preparing diene adducts.

We have found a method by which diene adducts can be directly prepared by reacting alpha-beta unsaturated carbonyl compounds or esters thereof with an acylating agent in the presence of the dienophile partner, whereby the obtained intermediate reaction products, e. g. compounds with conjugated double-bonds hereafter referred to as dien-compounds, need not be isolated. In this way, the laborious and costly purification of the intermediates is avoided.

Our novel method offers the further advantage that it makes it possible to prepare diene adducts from such alpha-beta unsaturated carbonyl compounds as form dien-compounds, e. g. dienol esters, which are only very difficultly separable or unstable; this applies, for instance, to mesityl oxide or benzylidene acetone.

Alpha-beta unsaturated carbonyl compounds suitable for the invention are, for instance, crotonal, 2-ethyl-hexanal, mesityl oxide, benzylidene acetone, 3,5-dimethyl cyclohexenone and generally compounds of the type

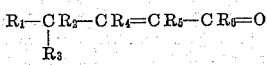

wherein $R_1$, $R_2$, $R_3$, $R_4$, $R_5$, $R_6$ may have the same or different composition and designate hydrogen, alkyl, aryl, carboxyl, hydroxyl, or esterified carboxyl or hydroxyl.

Acylating agents are, for instance, acetic anhydride, acrylic anhydride, maleic anhydride, acetyl chloride, ketene, or homologues of these compounds.

As dienophile compounds we may use, for instance, acrylic anhydride, maleic anhydride, acrylonitrile, acrylic esters, crotonal, cyclohexenone, quinones, and the like, as well as the derivatives and homologues of the recited compounds.

In order to prevent the resinification and polymerization of the unsaturated compounds, the reaction may be carried out in the presence of inhibitors, such as thionine or methylene blue; also catalysts may be added, if desired, for instance strong acids such as naphthalene sulfonic acids, chlorosulfonic acid, sulfuric acid, toluenesulfonic acids, and the like.

Our novel process offers a simple and economic method to synthesize commercially valuable compounds, such as derivatives of hydrophthalic acid, endovinyl cyclohexane, naphthohydroquinone, anthraquinone, and the like.

One embodiment of the invention consists in bringing the reaction components together into a reaction vessel, as illustrated by the following examples.

Example 1

60 g. of maleic anhydride (.6 mole), 50 g. of crotonal (.7 mole), 370 g. of acetic anhydride (3.7 moles), 0.5 g. of paratoluenesulfonic acid, and 0.2 g. of thionine are placed together into a flask and refluxed for 4 hours. After removal of the more volatile components, 80 g. of a fraction are obtained which distills at a pressure of 10 mm. at 158 to 165° C. and has a saponification number (S. N.) of 790. This distillate is 3-acetoxy-tetra-hydrophthalic anhydride, which contains as impurity some dihydrophthalic anhydride; by boiling with dilute hydrochloric acid, it is completely converted to dihydrophthalic acid. The yield is 65 percent.

Example 2

45 g. of benzylidene acetone (0.3 mole), 100 g. of acetic anhydride (1 mole), 60 g. of maleic anhydride (0.6 mole), 0.2 g. of para-toluenesulfonic acid and 0.1 g. of thionine are refluxed together for 12 hours. After the low volatile components had been distilled off, the residue was esterified with methanol. 15 g. of a fraction were obtained, which had a boiling point of 180–190° C. at Kp 0.2 and an S. N. of 400. The para-nitrophenyl-hydrazone of the ester had a melting point of 212° C. and a nitrogen content of 10.1%. The saponification number of the ester as well as the nitrogen content of the phenylhydrazone correspond to the values calculated for the 4-keto-6-phenyl-hexahydrophthalic acid dimethyl ester.

Example 3

125 g. of 2-ethyl-hexenal (1 mole), 120 g. of acetic anhydride (1.2 moles), 100 g. of maleic anhydride (1 mole), 0.3 of beta-naphthalenesulfonic acid, and 0.2 g. of thionine were mixed in a flask. Due to the dissolution of the maleic anhydride, the temperature dropped first to 5° C. and rose then slowly to 35 to 40° C. It remained at this level for about 45 min. without external heating. Afterwards, the mixture was heated for 3 hours at 50 to 60° C., whereupon the reaction was considered terminated.

The reaction product was first, without refluxing, carefully freed at 10 mm. pressure from all low volatile components. The residue was 245 g. of a brownish viscous oil, which after 24 hours began slowly to crystallize.

45 g. of the substance were separated and after three more days three times recrystallized from chloroform. 25 g. of pure white crystals were obtained, which had a sharp melting point of 128° C. and an S. N. of 635. This saponification number corresponds very well to that theoretically calculated of 631 for 2-acetoxy-4,6-diethyl tetrahydrophthalic anhydride.

Example 4

25 g. of 3,5-dimethylcyclohexenone (0.2 mole), 50 g. of acetic anhydride (0.5 mole), 40 g. of maleic anhydride (0.4 mole), 0.2 g. of thionine, and 0.2 g. of beta-naphthalene-sulfonic acid were refluxed for 16 hours. The reaction mixture was then fractionated, and after fractionation endo-vinylacetate dimethyl hexahydrophthalic anhydride was obtained in a 30% yield.

This example shows that the formation of an enol acetate takes place also with cyclic unsaturated ketones and that such enol acetates react directly, without previous separation, with maleic anhydride according to the diene reaction.

Example 5

20 g. of para-quinone (0.184 mole), 70 g. of acetic anhydride (0.7 mole), and 0.5 g. of beta-naphthalene sulfonic acid were brought to boiling, and 15 g. of crotonal (0.21 mole), 30 g. of acetic anhydride (0.3 mole and 0.2 g. of thionine were slowly added dropwise within a 90 min. period. Subsequently, the mixture was kept boiling for 3 more hours. The reaction product was cooled to −20° C. and allowed to stand at this temperature for 12 hours, when the precipitated crystals were filtered by means of suction. 5 g. of these crystals were sublimated and yielded 2 g. of hydroquinone diacetate and 3 g. of anthraquinone. After removal of the acetic acid, the residual filtrate was distilled, whereby hydroquinone diacetate was driven off. On further distillation of the residue in vacuo, 5 g. of a yellow oil were obtained, which entirely crystallized and proved to be hydronaphthoquinone diacetate.

Example 6

100 g. of ethyl acrylate (1 mole), 70 g. of crotonal (1 mole), 100 g. of anhydrous sodium acetate (1.2 moles), 200 g. of acetic anhydride (2 moles), and 0.2 g. of thionine were refluxed for 14 hours. After the sodium acetate had been crystallized out, the residual liquid was distilled, and 2-acetoxy tetrahydro benzoic acid ethyl ester and 3-acetoxy tetrahydro benzoic acid ethyl ester were obtained in a total yield of 30 percent.

Example 7

0.1 g. methylene blue and 0.4 g. sulfuric acid are added to 160 g. butylidene-acetoacetic acid methyl ester (1 mole), 120 g. acetic acid anhydride (1.2 moles) and 90 g. maleic acid anhydride (1 mole) and the reaction mixture was boiled under reflux for 18 hours. On working up by fractional distillation, the formed diene adduct aromatizes under liberation of hydrogen. 40 g. of a fraction boiling at 130–7° C/0.05 mm. were isolated that crystallizes giving a melting point of 82° C. after recrystallization from chloroform. The product showed no tendency to add bromine. Both, the saponification number and the C—H-determination yield values which agree accurately with the values calculated for the anhydride of the methyl ethyl trimellitic acid mono methyl ester, resp. for the anhydride of the propyl trimellitic acid monomethylester.

Another embodiment of the invention consists in first reacting the alpha, beta unsaturated carbonyl compounds with the acylating agent to dienol esters and adding subsequently the dienophillic component without previous isolation of the ester. This embodiment is illustrated by the following examples.

Example 8

125 g. of 2-ethylhexenal (1 mole), 120 g. of acetic anhydride (1.2 moles) and 0.5 g. of beta-naphthalene-sulfonic acid were refluxed for three hours. After termination of the reaction, 53 g. of acrylonitrile (1 mole) were added and the mixture was heated at boiling temperature for 14 more hours.

On working up the reaction product, it was found that the expected mixture of the two isomeric diene adducts, i. e. the 2-acetoxy-3,5-diethyl tetrahydrobenzonitrile and the 3-acetoxy-4,6-diethyl tetrahydrobenzonitrile split off the acetoxy group under the catalytic influence of the sulfuric acid and are converted to the diethyl dihydroxy benzonitrile, which can be isolated in pure form in a yield of more than 30 percent.

Example 9

20 g. of 2-ethylhexenal (.15 mole), 20 g. of acetic anhydride (.2 mole) and 0.1 g. of sulfuric acid were refluxed for 3 hours. The mixture was then cooled to 20° C., and 10 g. of p-quinone (0.1 mole) were added. An exothermic reaction took place, which raised the temperature to 45° C. When the temperature started falling, it was maintained at 40° C. by gentle heating. After 1 hour, the reaction could be considered terminated. 200 ml. of water were added, and the mixture was shaken until the unconsumed acetic anhydride was completely saponified. The precipitated partly crystalline and partly oily mass was filtered under strong suction. After drying, we obtained 18 g. of light brown crystals, which, after recrystallization from ligroin, had a constant melting point of 62–63° C.; the C—H analysis gave values corresponding to those calculated for diethyl acetoxy tetrahydronaphthoquinone.

By acetylation with acetic anhydride the product can be quantitatively converted to the diethyl naphthoquinone diacetate.

The process according to the invention may be carried out also in a solvent, such as benzene, xylene, and the like. It is also possible to use an excess of one of the components of the reaction as a solvent, for instance crotonaldehyde, 2-ethylhexenal, or the acylating agent, for instance acetic anhydride, may serve as the solvent.

This modification of the process is shown in the following examples.

Example 10

65 g. of 2-ethylhexenal (0.5 mole), 50 g. of maleic anhydride (0.5 mole), 100 g. of xylene (solvent), 0.2 g. of p-toluenesulfonic acid were heated under reflux for 8 hours. On cooling, crystals separated, which were recovered by filtering under suction. Yield 20 g. corresponding to 20 percent. The compound melted at 205 to 210° C. under gas development; the saponification number was 0, the acid number 500. The compound was the expected diethyldihydrophthalic acid.

Example 11

20 g. of maleic anhydride (0.2 mole), 25 g. of 2-ethylhexenal (0.27 mole), 0.1 g. of thionine, 0.2 g. of beta-naphthalenesulfonic acid were dissolved in 50 g. of benzene. Then 0.5 g. of ketene were introduced over a period of 3 hours. The temperature rose quickly to 68° C. and remained at this level for an extended period of time. Heating became necessary only towards the end of the reaction. The reaction product was acetoxy diethyl dihydrophthalic anhydride, which, during distillation, split off the acetoxy group and was converted to diethyl dihydrophthalic anhydride. Yield 80%.

Example 12

20 g. of maleic anhydride (0.2 mole), 0.1 g. of thionine, and 0.1 g. of beta-naphthalenesulfonic acid were dissolved in 100 g. (1.2 moles) of crotonal, which acted as reaction component and as solvent. Then 0.3 g. of ketene were introduced in said solution over a period of 3 hours. The temperature rose from 20 to 65° C. After the temperature had started dropping, the volatile ingredients were removed by vacuum distillation. 35 g. of a brown oil remain as residue which crystallizes and consists mainly of the delta-2,6-dihydrophthalic acid anhydride. It cannot be distilled but becomes resinous on heating; simultaneously the phthalic acid anhydride undergoes sublimation. The yield of the product was 90%, the sublimation yielded 16% of pure phthalic acid anhydride.

If larger quantities of the dienophile components are added to the two other components of the reaction, for instance in the double amount, the first resulting diene adduct can enter, without being separated, further diene reactions while splitting off the acetoxy group; these reactions yield secondary diene adducts. But also at least one other additional dienophile, may be used for carrying out the secondary diene synthesis than the dienophile used for the primary diene synthesis.

Example 13

A mixture of 100 g. of mesityl oxide (1 mole), 100 g. of acetylchloride (1.2 moles), 0.3 g. of thionine and 200 g. of maleic anhydride (2 moles) were refluxed for 24 hours. After cooling to 0° C., crystals precipitated out, which were filtered and recrystallized from glacial acetic acid and had a melting point of 268° C. and an S. N. of 819. These crystals consisted of endo vinyl dimethylcyclohexane tetracarbonic dianhydride, which was obtained in a 40% yield of the theory.

Example 14

100 g. of mesityl oxide (1 mole), 100 g. of acetic anhydride (1 mole), 200 g. of maleic anhydride (2 moles), 0.2 g. of p-toluenesulfonic acid, and 0.2 g. of thionine were heated under reflux for 24 hours. The solution was then cooled to 0° C. and the precipitated crystals were filtered off. We obtained 50 g. of crystals, which could be recrystallized from acetic anhydride, and had a melting point of 268° C. and an S. N. of 819; they were identified as endo vinyl dimethyl cyclohexane tetracarbonic dianhydride. The yield was 40 percent of the theoretical yield.

Example 15

125 g. of 2-ethylhexenal (1 mole), 150 g. of acetic anhydride (1.5 moles), 200 g. of maleic anhydride (2 moles), 0.2 g. of beta-naphthalenesulfonic acid and 0.3 g. of thionine were mixed in a flask. Hereby the temperature rose quickly to 125° C. After the temperature commenced to drop, the solution was heated for 4 more hours under reflux, whereby a large amount of crystals separated. After cooling, the crystals were filtered and washed with ether. We obtained 100 g. of pure white crystals, which after recrystallization from acetic anhydride had a melting point of 241° C., a saponification number of 645 and consisted of diethyl endovinyl cyclohexane tetracarbonic dianhydride. The yield corresponded to 75 percent of the theory.

Example 16

22 g. of crotonal were dissolved in 108 g. of acetic anhydride, and 0.1 g. of thionine and 0.2 g. of p-toluenesulfonic acid were added to the solution. The solution reacted with a slow temperature rise to 70° C. After one hour, the reaction was terminated and the temperature began to drop. The obtained solution of crotylidene diacetate was then slowly added, over a period of 60 min., dropwise to a solution of 60 g. of maleic anhydride in 100 g. of acetic anhydride and 0.3 g. of p-toluenesulfuric acid. After the mixture had been refluxed at 140° C. for 6 hours and then cooled to 20° C., 20 g. of crystals could be filtered off. The filtrate was then again refluxed for 14 hours, and after cooling, 30 g. of crystals could be again filtered off. After 90 percent of the acetic anhydride mixture had been distilled off from the filtrate, 11 more g. of crystals were obtained by filtration. The total yield of endovinyl cyclohexane tetracarbonic anhydride was, therefore, 61 g. corresponding to a theoretical yield of 82 percent.

Example 17

115 g. of crotonal (1.65 moles), 150 g. of ethyl acrylate (1.5 moles), and 500 g. of acetic anhydride were mixed and 0.1 g. of thionine, 0.5 g. of beta-naphthalenesulfonic acid, and 1 g. of CuO were added to the solution, which was then heated for 14 hours at boiling temperature.

The reaction mixture yielded, besides the dihydrobenzoic acid ethyl ester, the endovinyl cyclohexane dicarbonic acid diethyl ester. A portion of this ester was converted by an alcoholysis reaction into the dioctyl ester. Both esters were analyzed for the C—H content, and the determined values corresponded to those theoretically required.

Example 18

75 g. 2-ethylhexenal (0.6 mole), 60 g. ethyl acrylate (0.6 mole), 65 g. acetic acid anhydride (0.65 mole), 0.1 g sulfuric acid and 0.2 g. methylene blue were refluxed for 5 hours. 60 g. maleic acid anhydride (0.7 mole) were added to the resulting solution of diethyldihydrobenzoic-acid-ethyl-ester and refluxed for a further 14 hours. 30 g. of a fraction boiling at 175–82° C. under 0.5 mm. Hg with the saponification number of 550 are obtained of the fractional distillation. It is the endovinyl-diethyl-hexahydro-trimellitic-acid-anhydride - monomethyl-ester. By esterification with ethyl alcohol the triethyl ester of this acid is obtained the saponification number of which is 480. The saponification number of the monoester as well as of the triethyl ester agree with the calculated values.

Example 19

90 g. maleic acid anhydride (1 mole), 70 g. crotonaldehyde (1 mole), 190 g. acetic acid anhydride, 0.1 g. thionine and 0.1 g. sulfuric acid were refluxed for 18 hours. 80 g. of a substance boiling at 156–7° C./0.1 mm. with a saponification number of 750 can be isolated from the reaction mixture. It is the dimer of the dihydrophthalic acid anhydride, as it can be formed by a diene type dimerisation of this anhydride.

The results obtained by the novel process are all the more remarkable when it is taken into account that the formation of the end product is accomplished in a single operation; in most cases, four known intermediate stages have to be passed, which, however, need not be isolated. For the reaction components, crotonal, acetic anhydride, maleic anhydride, these intermediate stages are crotylidene diacetate, acetoxy tetrahydrophthalic anhydride, dihydrophthalic anhydride, and finally endovinyl cyclohexane tetracarbonic dianhydride. A similar sequence applies, of course, to all other alpha, beta unsaturated carbonyl compounds, with the exception of those which, like 3,5-dimethyl cyclohexenone, yield with acetic anhydride and maleic anhydride already in the first reaction as end products an endovinyl cyclohexane derivative, i. e., the endovinyl acetate dimethyl hexahydrophthalic anhydride.

An inversion of the reaction conditions may occur when the alpha-beta unsaturated carbonyl compound is offered in excess, as is for instance the case for the reaction couple quinone and crotonal.

Example 20

15 g. of crotonal (0.21 mole), 70 g. of acetic anhydride (0.7 mole), 20 g. of p-quinone (0.185 mole), 0.2 g. of thionine and 0.5 g. of beta-naphthalenesulfonic acid were mixed at room temperature. The temperature rose soon to about 70° C. After the temperature had dropped again to 20° C., the mixture was heated under reflux at boiling temperature. An exothermic start of the reaction could be distinctly observed. After 3 hours, 10 g. of anthraquinone crystals began to separate.

If the reactions embodied by the present invention are to be directed on a certain predeterminated diene adduct the stoichiometric rules have to be observed. The reaction temperature has to be kept at such a level that the reactants are not destroyed by the heat, e. g., the boiling temperature of the reaction mixture. If necessary the synthesis can be carried out at different pressure. The time needed to complete the reaction is dependent on the reactivity of the various reactants and intermediate compounds.

What we claim is:

1. A process for the preparation of endovinylene cyclohexane tetracarbonic acids and anhydrides thereof comprising mixing one mole of an alpha, beta unsaturated carbonyl compound, an acylating agent and two moles of maleic anhydride, condensing in said mixture said alpha, beta unsaturated carbonyl compound with said acylating agent to a dienol ester, and reacting said dienol ester in said mixture immediately with said maleic anhydride.

2. A process as defined in claim 1, wherein said alpha, beta unsaturated carbonyl compound is a member of the group consisting of alpha, beta unsaturated aldehydes, alpha, beta unsaturated ketones, and derivatives thereof.

3. A process as defined in claim 1, wherein said acylating agent is a member of the group consisting of acetic anhydride, acrylic anhydride, acetylchloride, homologues thereof, and ketenes.

4. A process for the preparation of endovinylene cyclohexane tetracarbonic acids and anhydrides thereof comprising mixing in the presence of a polymerization inhibitor one mole of an alpha, beta unsaturated carbonyl compound, an acylating agent and two moles of maleic anhydride, condensing in said mixture said alpha, beta unsaturated carbonyl compound with said acylating agent to a dienol ester, and reacting said dienol ester in said mixture immediately with said maleic anhydride.

5. A process as defined in claim 4, wherein said polymerization inhibitor is a compound selected from the group consisting of methylene blue and thionine.

6. A process for the preparation of endovinylene cyclohexane tetracarbonic acids and anhydrides thereof comprising mixing in the presence of an acid catalyst one mole of an alpha, beta unsaturated carbonyl compound, an acylating agent and two moles of maleic anhydride, condensing in said mixture said alpha, beta unsaturated carbonyl compound with said acylating agent to a dienol ester, and reacting said dienol ester in said mixture immediately with said maleic anhydride.

7. A process as defined in claim 6, wherein said acid catalyst is a member of the group consisting of naphthalene sulfonic acid, chlorosulfonic acid, toluene sulfonic acid, and sulfuric acid.

8. A process for the preparation of endovinylene cyclohexane tetracarbonic acids and anhydrides thereof comprising dissolving one mole of an alpha, beta unsaturated carbonyl compound, an acylating agent, and two moles of maleic anhydride, in an organic solvent, condensing in said solution said alpha, beta unsaturated carbonyl compound with said acylating agent to a dienol ester, and reacting said dienol ester in said solution with said maleic anhydride.

9. A process for the preparation of endovinylene cyclohexane tetracarbonic acids and anhydrides thereof comprising mixing one mole of an alpha, beta unsaturated carbonyl compound, an acylating agent and two moles of maleic anhydride, said alpha-beta unsaturated compound being present in an excess of the stoichiomatic amount required for the reaction with said acylating agent and serving as a solvent for the other components of the mixture, condensing in said solution said alpha, beta unsaturated carbonyl compound with said acylating agent to a dienol ester, and reacting said dienol ester in said solution with said maleic anhydride.

10. A process for the preparation of endovinylene cyclohexane tetracarbonic acids and anhydrides thereof comprising mixing one mole of an alpha, beta unsaturated carbonyl compound, an acylating agent and two moles of maleic anhydride, said acylating agent being present in an excess of the stoichiometric amount required for the reaction with said acylating agent and serving as a solvent for the other components of the mixture, condensing in said solution said alpha, beta unsaturated carbonyl compound with said acylating agent to a dienol ester, and reacting said dienol ester in said solution with said maleic anhydride.

References Cited in the file of this patent

UNITED STATES PATENTS

| | | |
|---|---|---|
| 1,993,034 | Humphrey | Mar. 5, 1935 |
| 2,121,294 | Humphrey | June 21, 1938 |
| 2,262,002 | Hopff et al. | Nov. 11, 1941 |
| 2,537,873 | Allen | Jan. 9, 1951 |
| 2,632,011 | Finch et al. | Mar. 17, 1953 |

FOREIGN PATENTS

| | | |
|---|---|---|
| 739,438 | Germany | Sept. 28, 1943 |

OTHER REFERENCES

Arbuzov, Chem. Abstracts 45: 6164(d) (1951) (endovinylene cyclohexane tetracarbonic dianhydride).